US012561209B2

(12) United States Patent
De Haro et al.

(10) Patent No.: US 12,561,209 B2
(45) Date of Patent: Feb. 24, 2026

(54) SYSTEM AND METHOD FOR PERFORMING A DEDICATED BACKUP IN A CONTAINERIZED ENVIRONMENT

(71) Applicant: Entrust Corporation, Shakopee, MN (US)

(72) Inventors: Carles De Haro, Barcelona (ES); David Mateos, Barcelona (ES)

(73) Assignee: Entrust Corporation, Shakopee, MN (US)

( * ) Notice: Subject to any disclaimer, the term of this patent is extended or adjusted under 35 U.S.C. 154(b) by 35 days.

(21) Appl. No.: 18/599,712

(22) Filed: Mar. 8, 2024

(65) Prior Publication Data

US 2024/0303163 A1 Sep. 12, 2024

Related U.S. Application Data

(60) Provisional application No. 63/489,081, filed on Mar. 8, 2023.

(51) Int. Cl.
*G06F 11/14* (2006.01)
*G06F 11/1446* (2026.01)

(52) U.S. Cl.
CPC ...... *G06F 11/1451* (2013.01); *G06F 11/1464* (2013.01); *G06F 2201/84* (2013.01)

(58) Field of Classification Search
CPC ............. G06F 11/1451; G06F 11/1464; G06F 2201/84; G06F 11/1458; G06F 11/1461
USPC ........................................ 711/162
See application file for complete search history.

(56) References Cited

U.S. PATENT DOCUMENTS

| | | | |
|---|---|---|---|
| 2021/0011816 A1* | 1/2021 | Mitkar | G06F 11/301 |
| 2021/0271565 A1 | 9/2021 | Bhavanarushi et al. | |
| 2021/0357238 A1 | 11/2021 | Kirmse et al. | |
| 2022/0114004 A1 | 4/2022 | Hsu | |
| 2022/0291998 A1* | 9/2022 | Devaraj | G06F 3/0671 |
| 2023/0082186 A1* | 3/2023 | Balcha | G06F 11/2094 714/4.11 |
| 2024/0256396 A1* | 8/2024 | Prasannakumar | G06F 11/1469 |

FOREIGN PATENT DOCUMENTS

CN 111966467 A 11/2020

OTHER PUBLICATIONS

International Search Report and Written Opinion for PCT/US2024/019257, mailed Jul. 3, 2024.

* cited by examiner

*Primary Examiner* — Jared I Rutz
*Assistant Examiner* — Wei Ma
(74) *Attorney, Agent, or Firm* — Merchant & Gould P.C.

(57) ABSTRACT

A process for performing a dedicated backup in a containerized environment is provided. In example aspects, a backup pod performs a backup process for an associated application. The backup pod is customized to contain backup tools that are specific to the backup process for the associated application. The backup pod works in connection with a backup manager that may interface with different backup pods customized for use in conjunction with different containerized applications. In some cases, the backup manager coordinates with each backup pod to provide backup processes for the different containerized applications.

23 Claims, 8 Drawing Sheets

SYSTEM AND METHOD FOR PERFORMING A DEDICATED BACKUP IN A CONTAINERIZED ENVIRONMENT

CROSS-REFERENCE TO RELATED APPLICATIONS

The present application claims priority from U.S. Provisional Application No. 63/489,081, filed on Mar. 8, 2023, the disclosure of which is hereby incorporated by reference in its entirety.

BACKGROUND

Deployed applications require regular backups of their associated data, including stored data and settings data, to ensure the applications function properly and can be restored to operation quickly in the event of a data loss. This includes both applications installed on enterprise hardware, and applications that may be hosted within enterprise or third party cloud environments, including within containerized execution environments (e.g., within Kubernetes or similar containerization environments).

With a wide variety of applications each having different functions, types of data stored, and access privileges, it is difficult to maintain a backup solution that accurately performs backups for each variety of application. Global backup solutions attempt to implement a single backup service that incorporates any and all tools needed to perform a backup for any type of application. However, with a global backup solution, there is no guarantee that the backup service contains all of the tools necessary to accurately backup any given application. As such, as applications evolve, the global backup solution must be perpetually updated to account for every new iteration or variation of application that is deployed.

Further, many backup solutions, including such global backup solutions and application-specific backup solutions, create "snapshots" of the application and its associated data to create the backup. Because all data associated with the application is captured by the snapshot, the backup can be bulky and resource-intensive, storing more data than is necessary to protect the state of the application.

SUMMARY

In general, the present disclosure relates to a system and method for performing a dedicated backup within a containerized environment. In example embodiments, a backup manager is connected to a backup pod. The backup pod performs a backup process for an associated application using backup tools specific to the application. The backup manager may receive requests for backup operations, and perform a supervisory role with respect to the backup.

In a first aspect, a method for performing a dedicated backup in a containerized environment is provided. The method includes receiving a request to perform a backup for a first application. The first application operates in a first pod in a first namespace in the containerized environment. The request is received by a backup manager. In response to the request, the backup manager sends an activation signal to a first backup pod. The first backup pod operates in a second pod in the first namespace and is customized to perform a backup process for the first application using at least one backup tool specific to the backup process. The backup pod then sends a first backup file to the backup manager. The method includes the backup manager sending the first backup file to a storage system.

In a second aspect, a system for performing a dedicated backup in a containerized environment is provided. The system comprises a backup manager and a backup pod. The backup pod operates in a first namespace in the containerized environment, and is configured to perform a backup process using at least one backup tool specific to the backup process. It is further configured to send a backup file to the backup manager. The backup manager operates in the containerized environment.

In a third aspect, a method of performing a dedicated backup in a containerized environment is disclosed. The method includes receiving, at a backup manager in the containerized environment, a request to perform a backup of a first application operating in a first application pod in the containerized environment. The method further includes receiving, at the backup manager, a request to perform a backup of a second application operating in a second application pod in the containerized environment. The method also includes sending an activation signal from the backup manager to a first backup pod including a plurality of backup tools customized to perform a backup process specific to the first application, and sending a second activation signal from the backup manager to a second backup pod including a second plurality of backup tools customized to perform a backup process specific to the second application, the second backup pod being separate from and including a different set of tools as compared to the first backup pod. The method includes receiving, at the backup manager, a first backup file from the first backup pod, and receiving, at the backup manager, a second backup file from the second backup pod. The method further includes sending the first backup file from the backup manager to a storage system, and sending the second backup file from the backup manager to the storage system.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

The following drawings are illustrative of particular embodiments of the present disclosure and therefore do not limit the scope of the present disclosure. The drawings are not to scale and are intended for use in conjunction with the explanations in the following detailed description. Embodiments of the present disclosure will hereinafter be described in conjunction with the appended drawings, wherein like numerals denote like elements.

DETAILED DESCRIPTION

Figure 1:
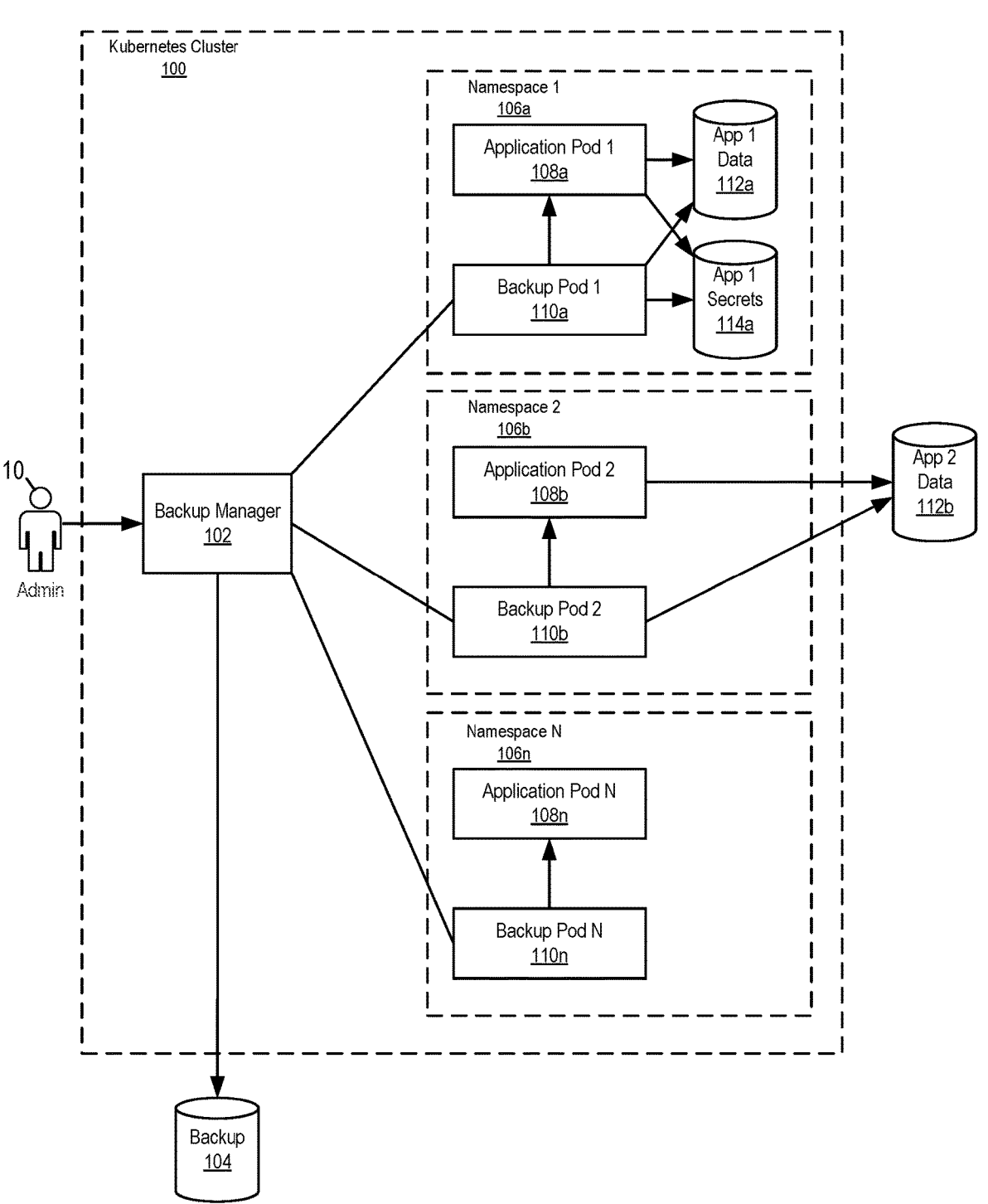
FIG. 1 illustrates an example block diagram of a containerized environment utilizing a system for performing a dedicated backup.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

As used herein, the term "including" as used herein should be read to mean "including, without limitation," "including but not limited to," or the like.

As briefly described above, embodiments of the present invention are directed to a system and method for performing a dedicated backup within a containerized environment. In example aspects, a backup manager for the containerized environment will receive a request to perform a backup of the status of a plurality of applications deployed in the containerized environment. In such an environment, applications are typically maintained within isolated namespaces. The backup manager orchestrates a backup process for any applications in the containerized environment for which a backup is requested. For each application for which a backup is requested, the backup manager activates a support backup pod that is housed in the same namespace as its associated application. The support backup pod may be provided by the application provider and configured to interface to the backup manager, or may be provided by a provider of the backup manager as an extensible portion of an overall backup service. The backup pods are customized to perform the backup for the associated application, containing a minimum set of backup tools necessary to complete the backup process for the associated application. After each backup pod activated by the backup manager completes the backup of its associated application, it sends a backup file to the backup manager, which then stores the backup files in a storage system. Different applications are associated with different backup pods, with each backup pod being interfaced to the backup manager for backup coordination.

In particular application deployment environments, such as containerized application deployment environments, existing backup solutions may typically utilize a universal backup service that is intended to be able to back up application information from any of the variety of types of applications that may be maintained within deployed, containerized environments. By way of contrast, by performing the backup process with a customized backup pod, the backup pod remains lightweight, and the backup process is more efficient. For example, the backup pod does not contain an expansive library of backup tools that could be used to perform backups for a variety of applications to which it is not associated; it contains the minimum set of backup tools necessary to back up its associated application. This also increases the efficiency of the backup process as the backup pod does not need to complete a diagnostic of its associated application to determine which backup tools to use during the backup process. The efficiency of the backup process is further improved because the backup pod is configured to only obtain and backup those files that need to be included in the backup process, decreasing the number of operations performed during the backup process and reducing the size of the backup file created.

Additionally, in those instances where the backup pod is supplied by the provider of the application, it is easily updated with new tools when the application is updated. Furthermore, by hosting the backup pod and the application in separate pods in the containerized environment, the application can be updated separately from the backup pod if the backup pod does not need to be updated, and vice versa.

In the embodiments described herein, the containerized environment is a Kubernetes environment. The systems and methods described herein can function in alternative containerized environments, including Amazon Elastic Container Service from Amazon, Inc., AWS Fargate from Amazon, Inc., Red Hat OpenShift from Red Hat, Inc., Nomad from HashiCorp, Inc., and Docker Swarm from Docker, Inc. Although terminology used herein—such as cluster, namespace, and pod—may be used in Kubernetes environments and not an alternative containerized environment, it is understood to one of ordinary skill in the art that similarly functioning features of the alternative containerized environments may be used, even if these features have a different name. Accordingly, a pod may correspond to an isolated execution context, including one or more wrappers for a containerized execution environment. The containerized execution environment may include one or more execution containers which may host applications or other executing code, storage systems, and the like. A namespace may define a particular logical grouping of pods that isolates a user of a particular container or containers (e.g., the pods) from user rights required to access a host computing node on which containerized code may reside. Other names for such concepts, or groups of logical containers and access rights, may be used as well.

Turning first to FIG. 1, aspects of a system for performing a dedicated backup in a containerized environment are shown. In the illustrated embodiment, a backup manager 102 resides in a cluster 100 implemented using a plurality of computing nodes. The cluster 100 may include a plurality of namespaces 106 containing applications executing within application containers, illustrated as application pods 108. Additionally, the namespaces 106 may include backup pods 110, respectively, associated with the application pods 108.

In examples, the cluster 100 may be managed by an enterprise, and the applications may be maintained within enterprise or third party cloud computing infrastructure, including computing nodes providing compute and storage capabilities. The applications may be accessible by personnel within the enterprise or external to the enterprise, depending on the specific application function. Example applications are described in further detail below. In the example shown, a plurality of different applications are configured to use various types of resources that may be external to the application pod within which the application resides and executes. For example, in the example shown, a first application pod, designated as Application Pod 1, 108a, hosts an application that interfaces with application data 112a and application secrets 114a. The application data 112a and application secrets 114 are positioned within the same namespace 106*a* as the application pod 108*a*, but are external to the application pod 108*a*. A second application pod, designated as Application Pod 2, 108*b*, hosts an application that interfaces with application data 112*b*, which is maintained entirely outside of the same namespace 106*b* in which the application pod 108*b* resides, and in the example shown, separate from the cluster 100 entirely. Furthermore, a third application pod, designated as Application Pod N, 108*n*, may host an application that does not require access to resources external to that application pod. These represent various examples of possible application configurations within the cluster 100, and in particular, within the containerized execution environments provided therein.

In some embodiments, the backup manager 102 may operate within its own namespace. The backup manager 102 may be accessible to a system administrator through an application programming interface (API). Through the API, the system administrator can schedule backups for each application executing within an application pod 108.

The backup manager 102 is connected to each backup pod 110 and can activate the backup pods 110 when a backup is requested for one or more of the applications. The backup manager 102 can activate individual backup pods 110 or multiple such backup pods, depending on the applications for which a backup is requested. In an embodiment, the backup manger 102 discovers all of the backup pods 110 in the namespace by scanning all pods at a Kubernetes level on which all of the backup pods 110 are located. In an alternative embodiment, the backup pods 110 are all named according to a naming convention, and the backup manager 102 discovers the backup pods 110 by searching for all objects that match the naming convention. In a further embodiment, the backup pods 110 are registered with the backup manager 102 by their associated applications when the applications are registered within a particular enterprise environment.

The backup manager 102 activates the backup pods 110 when a backup is requested for the applications. The backup may be requested by an administrative user 10 at the backup manager 102, for example by setting a backup schedule for one or more of the applications. In examples, the backup manager 102 may be configured to initiate a backup of applications based at least in part on business sensitivity, e.g., daily, weekly, etc. The backup manager 102 communicates with the backup pods 110 through an API. Each backup pod 110 may share the same API exposed by the backup manager. In this way, the backup pods 110 may be developed by third parties, such as application providers, and communicatively linked to the backup manager in a consistent manner.

The backup pods 110 include backup utilities that perform backups for their associated application 108, either alone or in conjunction with a set of common services provided by the backup manager 102. The backup utilities provided in each backup pod may be aggregated into a single utility, or may be instantiated within the respective backup pod as a separate set of tools and services. For simplicity, these possible constructions are referred to herein by discussing operations of the backup pod generally.

In example embodiments, the backup pod 110 may access the same resources as are accessible by its associated application within the corresponding application pod 108. These resources can be maintained in the namespace 106 with the application pod 108 and the backup pod 110—like the Application 1 Data 112*a* and the Application 1 Secrets 114*a*—or they can be maintained externally—like Application 2 Data 112*b*.

After a backup pod 110 completes the backup for its associated application, it sends a backup file to the backup manager 102. The backup manager 102 may store the backup file in an external storage system 104. In alternative embodiments, the backup file may be stored in a storage system within the Kubernetes cluster 100. The backup file may be secured (e.g., encrypted or otherwise protected) by the backup pod 110 or the backup manager 102, or both. This ensures secure communications of the backup file as it is transmitted throughout the backup process.

In the depicted embodiment, each application is deployed in a single application pod 108. In alternative embodiments, applications may be deployed across multiple application pods 108. In such implementations, a backup pod 110 may be associated with at least one of the application pods, or could be associated with each of the application pods. In some instances, portions of the backup pod 110 may be distributed in association with the distributed application deployed across the plurality of application pods.

Figure 2:
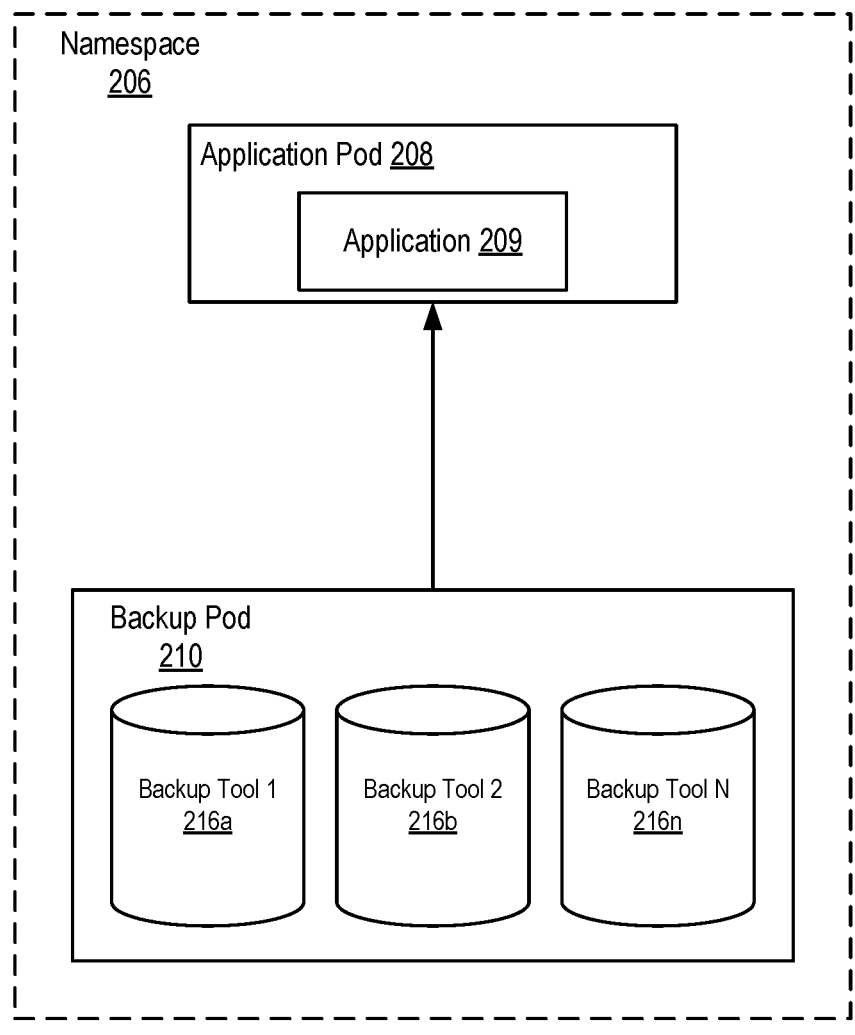
FIG. 2 illustrates an example block diagram of a namespace in a containerized environment utilizing the system for performing a dedicated backup.

Turning now to FIG. 2, a detailed view of a namespace 200 in a Kubernetes environment is shown. In the depicted embodiment, the namespace 200 includes a backup pod 210, which can be used to implement the backup pod 110 described above. In the example shown, the backup pod 210 has a plurality of backup tools 216. These backup tools 216 are used by the backup pod 210 to complete a backup process. The backup tools 216 may include privileges for the backup pod 210. Because the backup pod 210 is uniquely associated with an application 209 executing within an application pod 208 (an example of application 108 described above), the backup tools 216 are tailored to the requirements for the backup process of the application 209. In some instances, as previously described, the backup pod 210, and backup tools 216, are provided by the same provider of the application 209; in other instances, the backup pod 210 and backup tools 216 are provided by the provider of a backup manager or backup service different from the provider of the application, but are deployed to each application such that a tailored backup pod 210 is associated with each application 209.

Example features of backup tools can include providing access to the application configuration, providing access to Kubernetes resources, providing access to an external resource (such as databases and hardware security modules (HSM)), updating application Kubernetes declarations through YAML or Helm charts, and database import and export tools. Backup tools with further capabilities may be included as necessary to perform a backup of an application.

Figure 3:
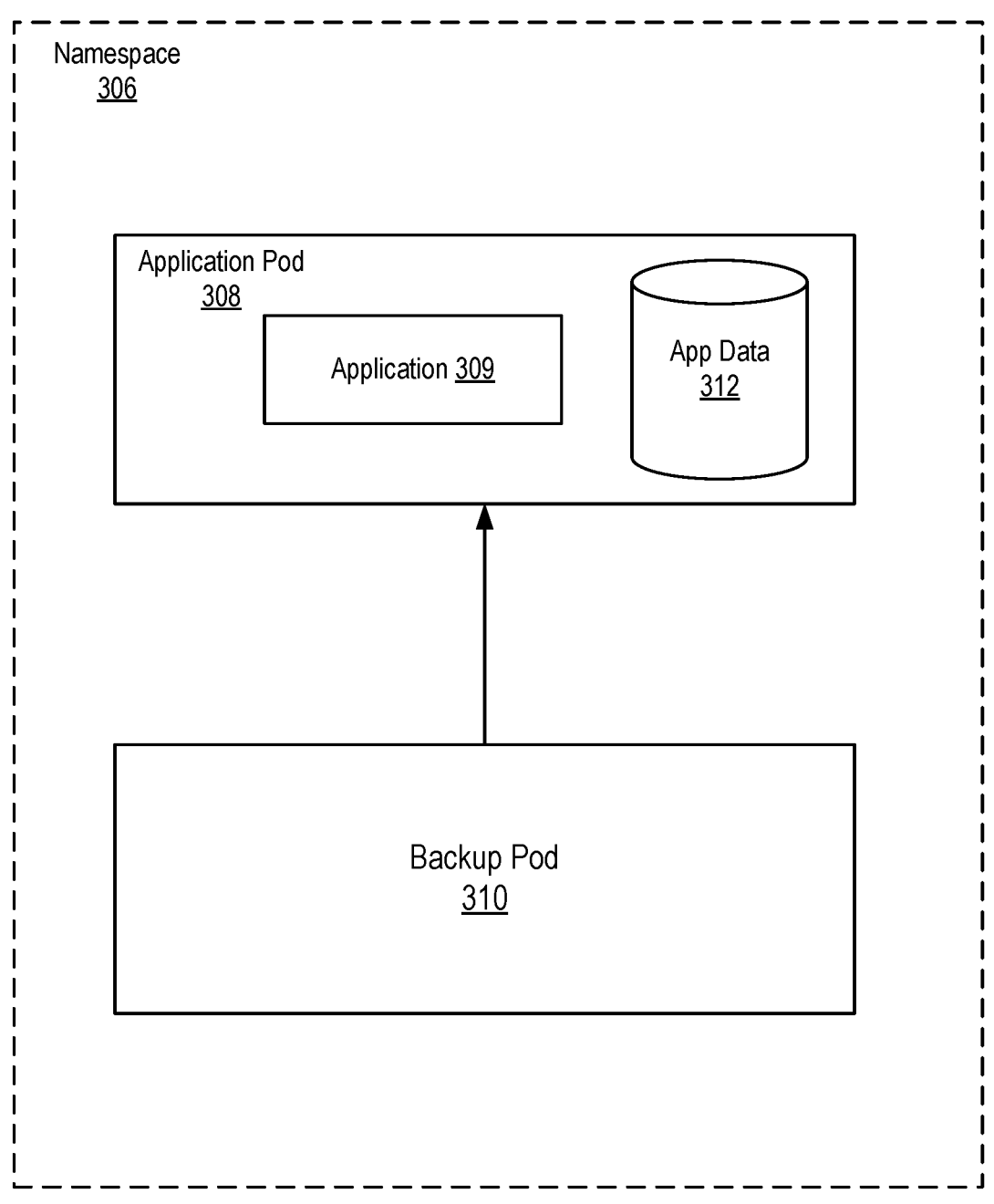
FIG. 3 illustrates an example embodiment of a namespace in a containerized environment utilizing the system for performing a dedicated backup.

FIG. 3 depicts an example embodiment of an environment in which a backup pod 310 is configured to interact with an application 309 executing within an application pod 308. In this example, the application 309 does not use external resources (i.e., resources external to the application pod 308). The application pod 308 in the illustrated embodiment contains the application data 312, which may be accessed from (e.g., written to or read from) the application 309. In an embodiment, the application data 312 is stored in a Kubernetes volume. In alternative embodiments, different data storage structures may be used.

In the illustrated embodiment, the backup pod 310 may have a small set of backup tools. The backup pod 310 may need to only capture critical backup data from the application pod 308, so the backup tools may comprise a script that executes to capture that data from the application pod 308. The backup tools may have same set of access privileges as the application pod 308 to allow it to capture all of the necessary data from the application pod 308. The backup tools may have access privileges that allow the backup pod 310 to capture application secrets-including passwords, API keys, and digital certificates-during the backup process. Such backup tools may have functionality specific to the application, from among data backup, application state backup and recovery, encryption of backup data, deduplication, data compliance, snapshot management, file capture and synchronization services, and the like. The backup pod 310 may contain additional backup tools as necessary to perform a backup for the application 309 as the application 309 gets additional features and complexity.

Figure 4:
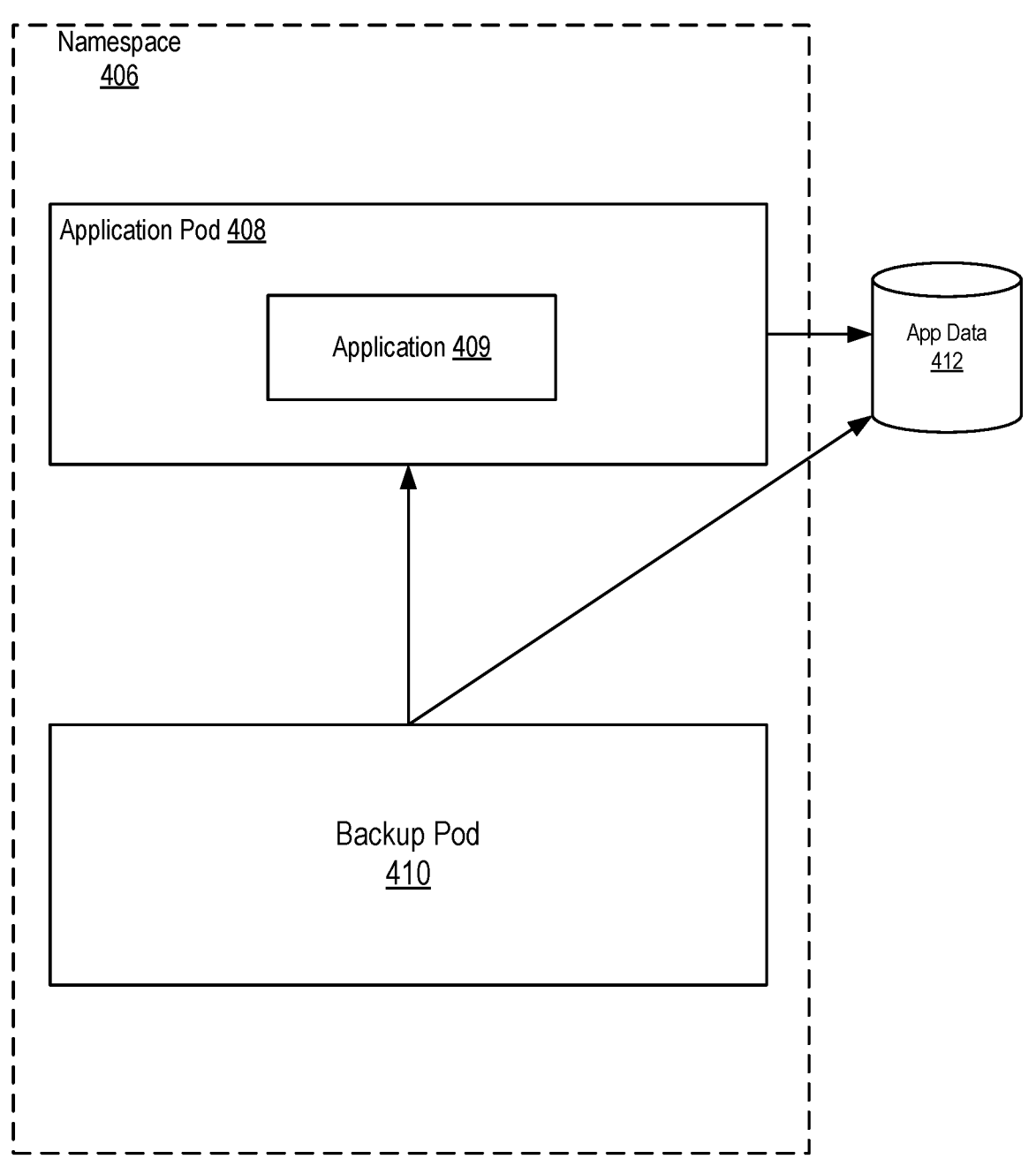
FIG. 4 illustrates an additional example embodiment of a namespace in a containerized environment utilizing the system for performing a dedicated backup.

Referring now to FIG. 4, an example embodiment of an environment is illustrated in which a backup pod 410 is shown configured to interface with an application 409 hosted within an application pod 408. In this example, the application 409 stores data in an external storage 412. In an embodiment, the external storage 412 is a database. The backup pod 410 in the depicted embodiment has backup tools to capture data from the application pod 408 related to the application 409 interfacing with the external storage 412, such as connection strings and the time of last connectivity. The backup pod 410 may possess the same privileges as backup pods discussed in previous embodiments. The backup pod 410 may also contain additional backup tools to capture backup data from the external storage 412.

In an embodiment, the backup tools may contain privileges to access secrets stored in the application pod 408 and used by the application 409, such as access credentials for the external storage 412. Additionally, the backup pod 410 may contain a backup tool to capture a log from the external storage 412 of changes that have been made. In alternative embodiments, the backup pod 410 may contain a backup tool to perform a complete backup of the external storage 412. In embodiments in which the external storage 412 is a database, the backup tools may provide database import and export tools.

Because the backup pod 410 is provided by and configured for the application 409, a backup tool that captures backup data from the external storage 412 can be more efficient. Rather than just capturing a snapshot of all application files stored in the external storage 412, the backup tool may be configured to selectively backup files in the external storage 412, capturing a backup of the important files while skipping unnecessary files, such as temporary files.

In embodiments that provide a backup of application files stored in the external storage 412, the backup tools may possess additional privileges. In an embodiment, the backup tools may possess permissions to update Kubernetes declarations to change the state of the application 409 to temporarily put the application 409 into a read only mode during the backup process. The state of the application 409, or application pod 408, may be changed using YAML or Helm charts. This prevents files from being edited during the backup process and ensures that the files captured from the backup of the external storage 412 are consistent with one another.

Figure 5:
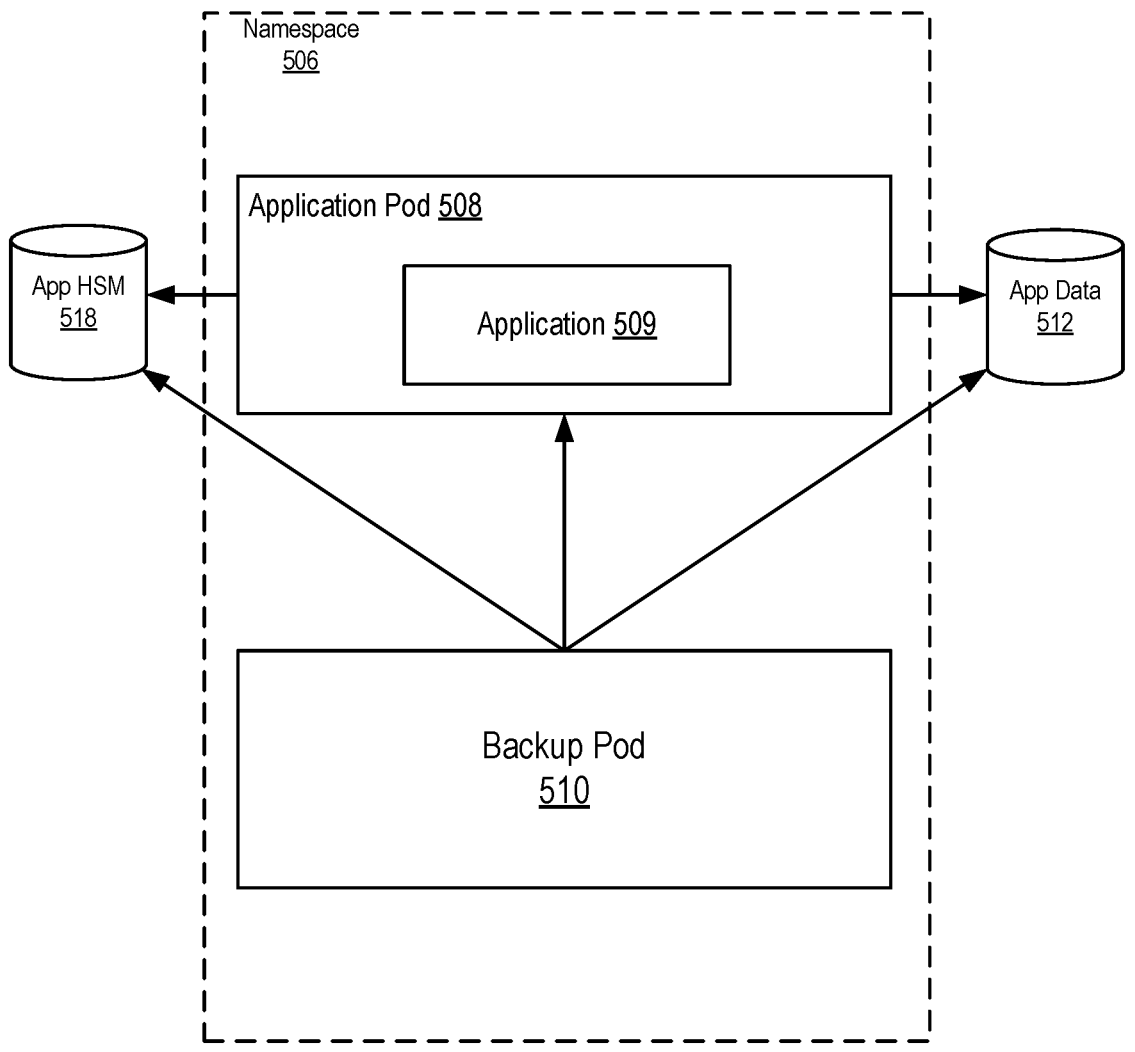
FIG. 5 illustrates a further example embodiment of a namespace in a containerized environment utilizing the system for performing a dedicated backup.

Turning now to FIG. 5, a further example embodiment of an environment in which a backup pod 510 is configured to interact with an application 509 within an application pod 508 is illustrated. In the depicted embodiment, a backup pod 510 is configured to perform the backup for the application 509 executing within an application pod 508. The application 509 is operable using resources external to the application pod 508, in particular an external storage 512 and an external HSM 518. The backup pod 510 in the depicted embodiment may contain the backup tools described above to handle the backup with the external storage 512. The backup pod 510 may also include additional backup tools to handle the external HSM 518.

Because of the security of the HSM 518, the backup pod 510 may possess higher privileges than previously described backup pods in order to access the HSM 518. For example, the backup pod 510 may contain a backup tool to capture the keys generated in the HSM 518. The backup pod 510 may further contain a backup tool to ensure that the keys captured from the HSM 518 remain secure throughout the backup process.

Figure 6:
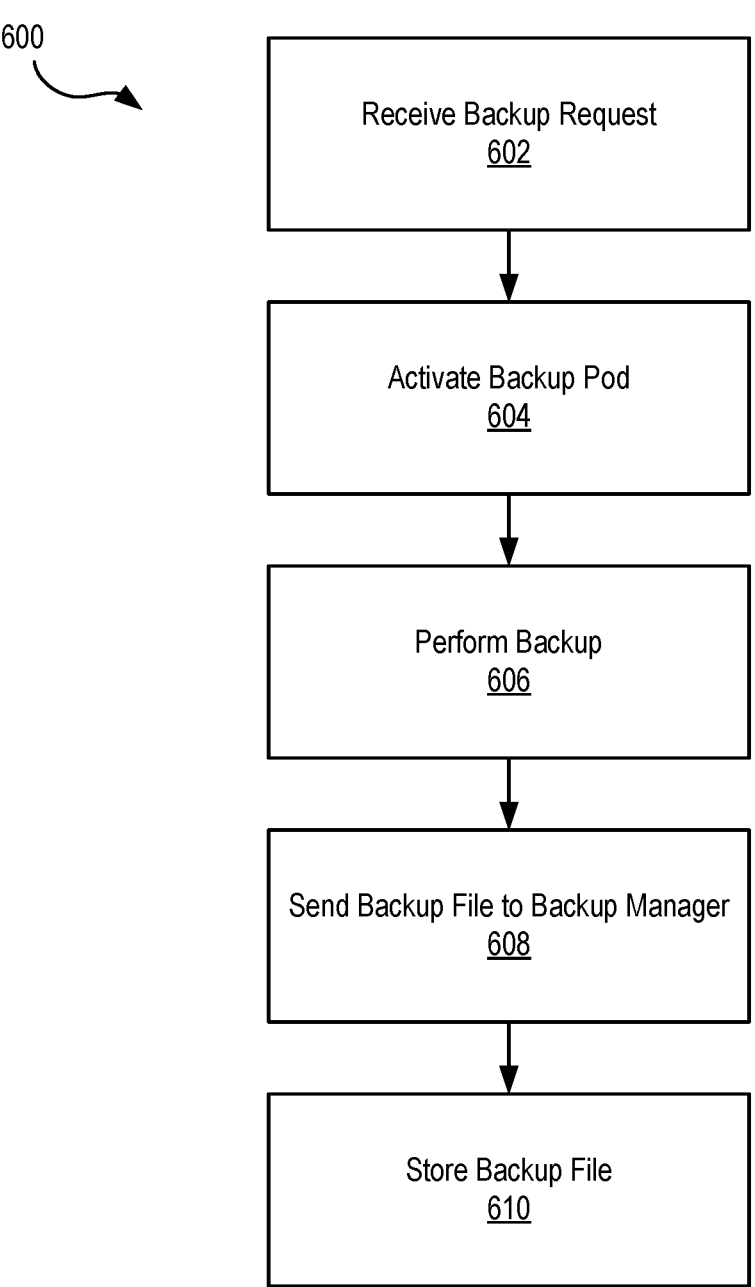
FIG. 6 illustrates a flowchart of a method of performing a dedicated backup in a containerized environment.

FIG. 6 shows a flowchart describing a backup process 600 performed using a backup pod. The backup pod may be any of the previously described examples of backup pods. In the example shown, the process 600 includes, at step 602, a backup manager receiving a request to perform a backup. In an embodiment, the request is received from a system administrator. In alternative embodiments, the backup is scheduled to be performed at periodic intervals, and the backup request is received in accordance with the backup schedule. Furthermore, the backup process 600 may be performed concurrently for a plurality of different backup processes associated with different applications, as seen in FIG. 1.

In the example shown, the process 600 may include, at step 604, the activating at least one backup pod to perform a backup for at least one application. Activating at least one backup pod may be performed by the backup manager. In some instances, the backup manager may activate all backup pods to which it is connected, or a subset thereof.

In the example shown, the process 600 may include, at step 606, the one or more backup pods that were activated by the backup manager performing backups for their associated applications. Each backup pod contains a set of backup tools that are used during a backup process. The backup tools contained within each backup pod are customized for the backup process for the associated application, and as such, different ones of the activated backup pods may have different sets of backup tools and/or access privileges. During the backup process, the backup pods generate backup files with the backup of their associated applications.

In the example shown, the process 600 may include, at step 608, the backup pods that were activated sending the backup files they created during the backup process to the backup manager. In an embodiment, the backup pods secure the backup files before sending them to the backup manager. At step 610, the backup manager sends the backup files it received to a database to store the files. In an embodiment, the backup manager secures the backup files before sending them to the database.

Figure 7:
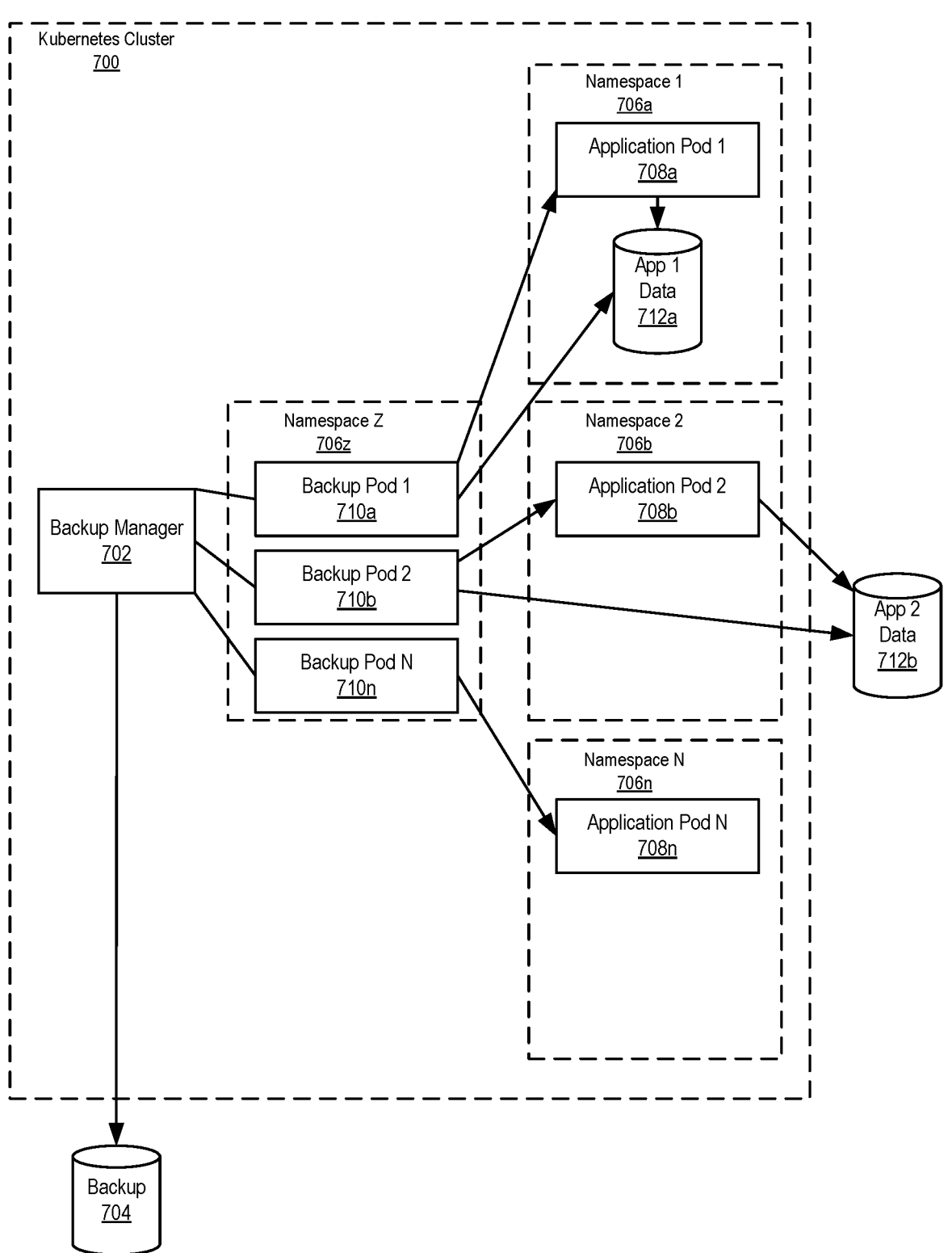
FIG. 7 illustrates an example block diagram of a containerized environment utilizing an alternative embodiment of a system for performing a dedicated backup.

Referring now to FIG. 7, an alternative embodiment of the backup system is shown. In this embodiment, backup pods 710a-n (collectively backup pods 710) are all contained in one namespace 7062, rather than in the namespace 706 with their associated applications 708. The backup pods 710 function in a similar manner to the backup pods described in the above embodiments, having backup tools and privileges to perform a backup process for their associated application 708. The backup pods 710 may possess additional privileges to allow them to access Kubernetes resources in different namespaces, such as the Application 1 Data 712a. In further embodiments, there may be some backup pods in the namespace with their associated application and other backup pods contained in one namespace together.

Figure 8:
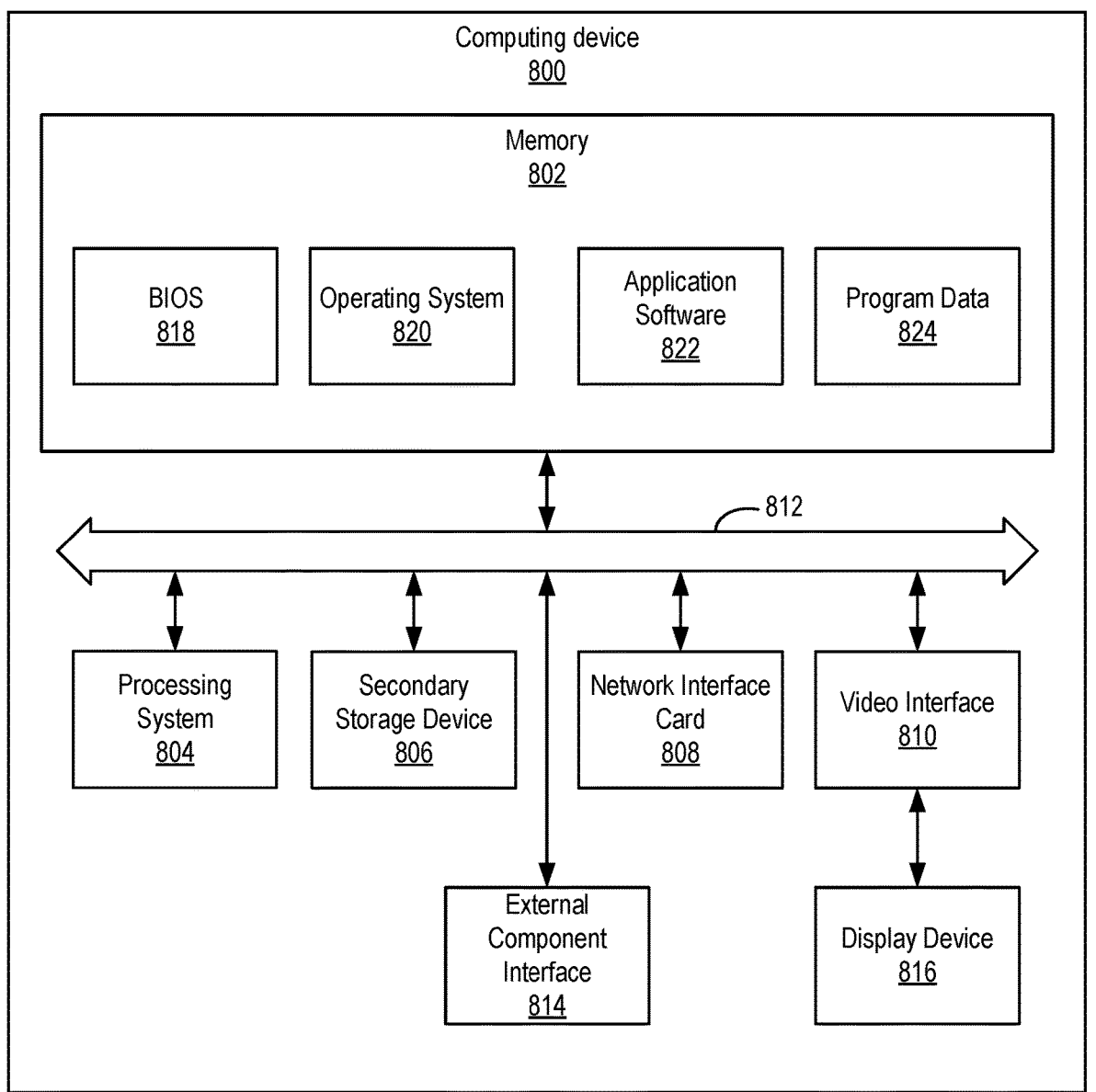
FIG. 8 illustrates an example computing system on which aspects of the present disclosure may be implemented.

FIG. 8 illustrates an example computing system 800 on which aspects of the present disclosure may be implemented. The computing device 800 can be used, for example, to host the Kubernetes Cluster 100 or implement any external system device, such as the external application database 112b or the system backup database 104.

In the example of FIG. 8, the computing device 800 includes a memory 802, a processing system 804, a secondary storage device 806, a network interface card 808, a video interface 810, a display unit 816, an external component interface 814, and a communication medium 812. The memory 802 includes one or more computer storage media capable of storing data and/or instructions. In different embodiments, the memory 802 is implemented in different ways. For example, the memory 802 can be implemented using various types of computer storage media, and generally includes at least some tangible media. In some embodiments, the memory 802 is implemented using entirely non-transitory media.

The processing system 804 includes one or more processing units, or programmable circuits. A processing unit is a physical device or article of manufacture comprising one or more integrated circuits that selectively execute software instructions. In various embodiments, the processing system 804 is implemented in various ways. For example, the processing system 804 can be implemented as one or more physical or logical processing cores. In another example, the processing system 804 can include one or more separate microprocessors. In yet another example embodiment, the processing system 804 can include an application-specific integrated circuit (ASIC) that provides specific functionality. In yet another example, the processing system 804 provides specific functionality by using an ASIC and by executing computer-executable instructions.

The secondary storage device 806 includes one or more computer storage media. The secondary storage device 806 stores data and software instructions not directly accessible by the processing system 804. In other words, the processing system 804 performs an I/O operation to retrieve data and/or software instructions from the secondary storage device 806. In various embodiments, the secondary storage device 806 includes various types of computer storage media. For example, the secondary storage device 806 can include one or more magnetic disks, magnetic tape drives, optical discs, solid-state memory devices, and/or other types of tangible computer storage media.

The network interface card 808 enables the computing device 800 to send data to and receive data from a communication network. In different embodiments, the network interface card 808 is implemented in different ways. For example, the network interface card 808 can be implemented as an Ethernet interface, a fiber optic network interface, a wireless network interface (e.g., WiFi, WiMax, Bluetooth, etc.), or another type of network interface.

In optional embodiments where it is included in the computing device 800, the video interface 810 enables the computing device 800 to output video information to the display unit 816. The display unit 816 can be various types of devices for displaying video information, such as an LCD display panel, a plasma screen display panel, a touch-sensitive display panel, an LED or OLED screen, a cathode-ray tube display, or a projector. The video interface 810 can communicate with the display unit 816 in various ways, such as via a Universal Serial Bus (USB) connector, a VGA connector, a digital visual interface (DVI) connector, an S-Video connector, a High-Definition Multimedia Interface (HDMI) interface, or a DisplayPort connector.

The external component interface 814 enables the computing device 800 to communicate with external devices. For example, the external component interface 814 can be a USB interface and/or another type of interface that enables the computing device 800 to communicate with external devices or peripheral devices integrated within the same housing (e.g., in the case of mobile devices). In various embodiments, the external component interface 814 enables the computing device 800 to communicate with various external components, such as external storage devices, input devices, speakers, modems, media player docks, other computing devices, scanners, digital cameras, and fingerprint readers.

The communication medium 812 facilitates communication among the hardware components of the computing device 800. The communications medium 812 facilitates communication among the memory 802, the processing system 804, the secondary storage device 806, the network interface card 808, the video interface 810, and the external component interface 814. The communications medium 812 can be implemented in various ways. For example, the communication medium 812 can include a PCI bus, a PCI Express bus, an accelerated graphics port (AGP) bus, a serial Advanced Technology Attachment (ATA) interconnect, a parallel ATA interconnect, a Fiber Channel interconnect, a USB bus, a Small Computing system Interface (SCSI) interface, or another type of communications medium.

The memory 802 stores various types of data and/or software instructions. The memory 802 stores a Basic Input/Output System (BIOS) 818 and an operating system 820. The BIOS 818 includes a set of computer-executable instructions that, when executed by the processing system 804, cause the computing device 800 to boot up. The operating system 820 includes a set of computer-executable instructions that, when executed by the processing system 804, cause the computing device 800 to provide an operating system that coordinates the activities and sharing of resources of the computing device 800. Furthermore, the memory 802 stores application software 822. The application software 822 includes computer-executable instructions, that when executed by the processing system 804, cause the computing device 800 to provide one or more applications. The memory 802 also stores program data 824. The program data 824 is data used by programs that execute on the computing device 800.

Although particular features are discussed herein as included within an electronic computing device 800, it is recognized that in certain embodiments not all such components or features may be included within a computing device executing according to the methods and systems of the present disclosure. Furthermore, different types of hardware and/or software systems could be incorporated into such an electronic computing device.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

The invention claimed is:

1. A method of performing a dedicated backup within a containerized environment, the method comprising:
   receiving, at a backup manager in the containerized environment, a request to perform a backup of a first application in the containerized environment, wherein the first application is operating in a first pod in a first namespace in the containerized environment;
   sending an activation signal from the backup manager to a first backup pod, the first backup pod operating in a second pod in the first namespace and customized to perform a backup process specific to the first application, wherein the first backup pod has at least one backup tool specific to the backup process;
   receiving, at the backup manager, a first backup file from the first backup pod; and
   sending the first backup file from the backup manager to a storage system.

2. The method of claim 1, wherein the at least one backup tool includes a minimum set of backup tools necessary to perform the backup of the first application.

3. The method of claim 1, wherein the storage system is outside of the containerized environment.

4. The method of claim 1, further comprising:
   receiving, at the backup manager, a request to perform a backup of a second application in the containerized environment, wherein the second application is operating in a first pod in a second namespace in the containerized environment;
   sending an activation signal from the backup manager to a second backup pod, the second backup pod operating in a second pod in the second namespace and including a second backup tool customized to perform a second backup process that is specific to the second application, wherein the second backup pod has at least one backup tool specific to the second backup process, the at least one backup tool specific to the second backup process differing from the at least one backup tool specific to the first backup process;
   receiving, at the backup manager, a second backup file from the second backup pod; and
   sending the second backup file from the backup manager to the storage.

5. The method of claim 4, wherein the at least one backup tool specific to the second backup process includes a different set of backup tools compared to the at least one backup tool specific to the backup process specific to the first application.

6. The method of claim 4, wherein the at least one backup tool specific to the second backup process includes a minimum set of backup tools necessary to perform the backup of the second application.

7. The method of claim 4, wherein the second application is further operating in at least one additional pod in the second namespace.

8. The method of claim 1, wherein the backup manager is operating in a namespace separate from the first backup pod and the first application.

9. The method of claim 1, wherein the at least one backup tool includes a system for performing a backup of a hardware security module connected to the first application, wherein the hardware security module is maintained outside of the containerized environment.

10. The method of claim 1, wherein the at least one backup tool includes one or more utilities configured to transition the first application into a read-only state during the backup process.

11. The method of claim 1, wherein the request to perform a backup of a first application in the containerized environment is received at the backup manager through an application programming interface.

12. The method of claim 1, wherein the activation signal is sent from the backup manager to the first backup pod using an application programming interface.

13. A system for performing a dedicated backup in a containerized environment, the system comprising:
   a backup manager operating in the containerized environment;
   a backup pod operating in a first pod in a first namespace in the containerized environment and connected to the backup manager, the backup pod configured to perform a first backup process using at least one backup tool, the at least one backup tool being specific to the backup process, and send a backup file to the backup manager; and
   a storage system configured to store backup files received from the backup manager.

14. The system of claim 13, wherein the at least one backup tool includes a plurality of backup tools.

15. The system of claim 13, wherein the backup pod is customized to perform the first backup process for a first application, the first application operating in a second pod in the first namespace in the containerized environment.

16. The system of claim 13, further comprising a second backup pod operating in a first pod in a second namespace in the containerized environment and connected to the backup manager, the second backup pod configured to perform a second backup process using at least one backup tool, the at least one backup tool being specific to the second backup process and differing from the at least one backup tool specific to the first backup process, and send a second backup file to the backup manager.

17. The system of claim 16, wherein the at least one backup tool specific to the second backup process is customized to perform the second backup process for a second application and is different from the at least one backup tool specific to the first backup process.

18. The system of claim 13, wherein the backup manager is operating in a namespace separate from the backup pod.

19. The system of claim 13, wherein the at least one backup tool includes a system for performing a backup of a database maintained outside of the containerized environment.

20. The system of claim 13, wherein the at least one backup tool includes a system for performing a backup of a hardware security module maintained outside of the containerized environment.

21. A method of performing a dedicated backup in a containerized environment, the method comprising:
   receiving, at a backup manager in the containerized environment, a request to perform a backup of a first application operating in a first application pod in the containerized environment;
   receiving, at the backup manager, a request to perform a backup of a second application operating in a second application pod in the containerized environment;
   sending an activation signal from the backup manager to a first backup pod including a plurality of backup tools customized to perform a backup process specific to the first application;

sending a second activation signal from the backup manager to a second backup pod including a second plurality of backup tools customized to perform a backup process specific to the second application, the second backup pod being separate from and including a different set of tools as compared to the first backup pod;

receiving, at the backup manager, a first backup file from the first backup pod;

receiving, at the backup manager, a second backup file from the second backup pod;

sending the first backup file from the backup manager to a storage system; and sending the second backup file from the backup manager to the storage system.

22. The method of claim 21, wherein the first application pod and the first backup pod reside within a first namespace and the second application pod and the second backup pod reside within a second namespace separate from the first namespace.

23. The method of claim 21, wherein the first application pod resides within a first namespace and the second application pod resides within a second namespace, and wherein the first backup pod and the second backup pod reside within a third namespace separate from the first and second namespaces.

* * * * *